US008541556B1

(12) United States Patent
Gu

(10) Patent No.: US 8,541,556 B1
(45) Date of Patent: Sep. 24, 2013

(54) LIGNIN DERIVATIVES AND USES THEREOF

(71) Applicant: Empire Technology Development LLC, Wilmington, DE (US)

(72) Inventor: Yansong Gu, Bellevue, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/738,424

(22) Filed: Jan. 10, 2013

(51) Int. Cl.
*C08H 7/00* (2011.01)
(52) U.S. Cl.
USPC ........................................................ 530/500
(58) Field of Classification Search
USPC ........................................................ 530/500
See application file for complete search history.

(56) References Cited

U.S. PATENT DOCUMENTS

| | | | | |
|---|---|---|---|---|
| 2,429,102 | A | * | 10/1947 | Lewis et al. .................... 530/504 |
| 3,813,236 | A | * | 5/1974 | Allan et al. .................... 504/260 |
| 5,512,276 | A | | 4/1996 | Lang et al. |
| 6,541,038 | B1 | | 4/2003 | Tanaka et al. |
| 6,551,608 | B2 | * | 4/2003 | Yao .............................. 424/409 |
| 6,727,347 | B1 | | 4/2004 | Szego |
| 2003/0017565 | A1 | | 1/2003 | Echigo et al. |
| 2003/0055007 | A1 | | 3/2003 | Sakuma |
| 2009/0044292 | A1 | | 2/2009 | Tien et al. |
| 2009/0208366 | A1 | | 8/2009 | Subramanian |
| 2010/0124441 | A1 | * | 5/2010 | Ariyoshi et al. ............. 399/252 |
| 2010/0240592 | A1 | | 9/2010 | Demarco et al. |
| 2010/0254900 | A1 | | 10/2010 | Campbell et al. |
| 2010/0256089 | A1 | | 10/2010 | Maguire et al. |
| 2010/0260813 | A1 | * | 10/2010 | Schnabel et al. ............. 424/408 |
| 2011/0027394 | A1 | | 2/2011 | McClements et al. |
| 2011/0117176 | A1 | | 5/2011 | Klun et al. |
| 2011/0294928 | A1 | * | 12/2011 | Nodera et al. .................. 524/73 |

FOREIGN PATENT DOCUMENTS

| | | |
|---|---|---|
| EP | 2 199 046 A1 | 6/2010 |
| WO | WO 2010074228 A1 * | 7/2010 |

OTHER PUBLICATIONS

Freundlich, J. S., et al., "Synthesis, biological activity, and X-ray crystal structural analysis of diaryl ether inhibitors of malarial enoyl acyl carrier protein reductase. Part 1: 40-Substituted triclosan derivatives," Bioorg. Med. Chem. Lett., 2005, 15, 5247-5252.*
Sanches-Silvia, A., et al., "Determination of triclosan in foodstuffs," J. Sep. Sci., 2005, 28, 65-72.*
Schroeder, M., et al., "Enzymatic coating of lignocellulosic surfaces with polyphenols," Biotechnol. J., 2007, 2, 334-341.*
Akiyama et al., "Antibacterial action of several tannins against *Staphylococcus aureus*," Journal of Antimicrobial Chemotherapy, 2001, vol. 48, Issue 4, pp. 487-449.
American Association of Textile and Color Chemists (AATCC), Test Method 100-1993, AATCC Technical Manual, 1997, pp. 143-144.
Binh N., et al. "Synthesis of Lignin-Based Thermoplastic Copolyester Using Kraft Lignin as a Macromonomer," 2009, Composite Interfaces, vol. 16, Nos. 7-9, pp. 923-935.

Chung, D., et al., "Release of Propyl Paraben from a Polymer Coating into Water and Food Simulating Solvents for Antimicrobial Packaging Applications," Apr. 2001, Journal of Food Processing and Preservation, vol. 25, Issue 1, pp. 71-87. (Abstract Only).
Gemili, S., "Preparation and Characterization of Antimicrobial Polymeric Films for Food Packaging Applications," Jul. 2007, Thesis, Izmir Institute of Technology, 83 pages.
Gowrisankar et al., "A General and Efficient Catalyst for Palladium-Catalyzed C—O Coupling Reactions of Aryl Halides with Primary Alcohols," Journal of the American Chemical Society, 2010, vol. 132, Issue 33, pp. 11592-11598.
Han, H.J., "Antimicrobial Food Packaging," Mar. 2000, Food Technology, vol. 54, No. 3, pp. 56-65.
International Search Report and Written Opinion for International Application No. PCT/US2012/027490, mail date Apr. 24, 2012, 13 pages.
Kenawy, El-Refaie, et al., "The Chemistry and Applications of Antimicrobial Polymers: A State-of-the-Art Review," May 2007, BioMacromolecules, vol. 8, No. 5, pp. 1359-1384.
La Storia, D. Antonietta, "Development and Application of Antimicrobial Food Production," 2008, Doctoral Thesis Research in Science and Technology of Agro-Food Production, University of Naples, Italy, 121 pages.
Layton, L., "FDA Says Studies on Triclosan, Used in Sanitizers and Soaps, Raise Concerns," Apr. 8, 2010, The Washington Post, Corrected Version, 2 pages.
Li, Y., et al., "Alkylated Kraft Lignin Based Thermoplastic Blends with Aliphatic Polyesters," 2002, ACS Publication, Macromolecules, Macromolecules, vol. 35, No. 26., pp. 9707-9715.
Li, Yan, "Final Report: Biodegradable Thermoplastic Natural Fiber Composite," 2007, Environmental Protection Agency, Extramural Research Project, 2 pages.
Liz Earle, Naturally Active Skincare, "Ingredients Factsheet: The Truth About Preservatives," 2012, Liz Earle Beauty Co. Limited, 3 pages.
Sergeev et al., "Selective, Nickel-Catalyzed Hydrogenolysis of Aryl Ethers," Science, 2011, vol. 332, No. 6028, pp. 439-443.
Smolander, M., "Potential Nanotechnology Applications in Food Packaging," Sep. 23-25, 2009, International Forum on Emerging Technologies in Food Processing, University of Illinois, Urbana, IL, USA, 29 pages.
Tecnaro GmbH, Definition of Arboform, retrieved from http://www.tecnaro.de/english/arboform.htm on Dec. 9, 2010, 1 page.
Tyler, C. I., "Types of Antimicrobial Packaging Systems," retrieved from http://www.ehow.com/print/list_6558172_types-antimicrobial-packaging-systems.html on Dec. 28, 2012, 2 pages.
Veluri et al., "Phytotoxic and Antimicrobial Activities of Catechin Derivatives," Journal of Agricultural and Food Chemistry, Dec. 15, 2004, vol. 52, Issue 25, p. 7746.
Wilde, K.N., et al. "Evaluating the Cytotoxicity of Conjugated Polyelectrolyte Biocides," 2010, Abstract of Presentation at the American Institute of Chemical Engineers Annual Meeting, 1 page.
Chang et al., "Interactions of a Cationic Antimicrobial (ε-Polylysine) with an Anionic Biopolymer (Pectin): An Isothermal Titration Calorimetry, Microelectrophoresis, and Turbidity Study," J. Agric. Food Chem., 2011, 59 (10), pp. 5579-5588. (Abstract only).

(Continued)

*Primary Examiner* — Liam Heincer
*Assistant Examiner* — Nicholas Hill
(74) *Attorney, Agent, or Firm* — Foley & Lardner LLP

(57) ABSTRACT

An article including a lignin derivative, where the lignin derivative includes a moiety derived from an antimicrobial compound. Also provided are methods of inhibiting microbial growth with an article including a lignin derivative.

22 Claims, No Drawings

(56) References Cited

OTHER PUBLICATIONS

Helander et al., Permeabilizing action of polyethyleneimine on *Salmonella typhimurium* involves disruption of the outer membrane and interactions with lipopolysaccharide, Microbiology, 1998, vol. 144, pp. 385-390.

International Search Report and Written Opinion for International Application No. PCT/US2012/044547, mail date Aug. 31, 2012, 9 pages.

Vaara, M., Agents that increase the permeability of the outer membrane, Microbiological Reviews, 1992, vol. 56, pp. 395-411.

National Committee for Clinical Laboratory Standards, "Methods for dilution antimicrobial susceptibility tests for bacteria that grow aerobically," 1993, National Committee for Clinical Laboratory Standards, Villanova, Pa.,3rd ed., vol. 13, No. 5, NCCLS Document M7-A3, 54 pages.

\* cited by examiner

LIGNIN DERIVATIVES AND USES THEREOF

CROSS-REFERENCE TO RELATED APPLICATIONS

This application claims the benefit of International Application Serial No. PCT/US2012/027490, filed on Mar. 2, 2012, the entire disclosure of which is hereby incorporated by reference for all purposes in its entirety as if fully set forth herein.

FIELD

The present technology relates to an article including a lignin derivative, where the lignin derivative includes a moiety derived from an antimicrobial compound. Also provided are methods of inhibiting microbial growth with an article including a lignin derivative.

BACKGROUND

The following description is provided to assist the understanding of the reader. None of the information provided or references cited is admitted to be prior art to the present technology.

Native lignin is a naturally occurring cross-linked amorphous biopolymer that is an integral component of plant biomass. Lignin is the second most abundant biopolymer on earth after cellulose, and contributes to the strength and rigidity of plants and trees. Lignin hinders the process of converting wood into paper because most of the lignin must first be removed from wood to liberate wood fibers for the production of paper. Consequently, the pulp and paper industry annually generates over 45 million metric tons of lignin as a by-product of chemically-processed wood pulps and over 10 million metric tons of lignin as a by-product of mechanically-processed wood pulps. Some of the by-product lignin is used to make short-life paper products such as newsprint and telephone directories, but the majority is being used internally by pulp producers as a low-grade fuel for the chemical pulping operation. Accordingly, there is significant economic incentive to find new markets and more valuable uses for by-product lignin.

SUMMARY

In one aspect, an article includes a lignin derivative, the lignin derivative including a moiety derived from an antimicrobial compound. In certain embodiments, a lignin material includes a moiety represented by Formula I:

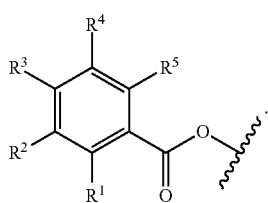

I

In Formula I, $R^1$, $R^2$, $R^4$, and $R^5$ are each independently H, halo, alkyl, alkenyl, aryl or heteroaryl; and $R^3$ is OH or SH. In some embodiments, the moiety represented by Formula I is:

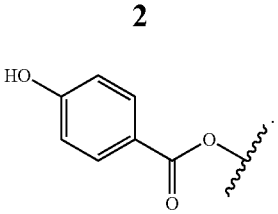

In some embodiments, the moiety derived from an antimicrobial compound may be derived from a paraben. In other embodiments, the moiety may be derived from a tannin, catechin, an antimicrobial component from an essential oil, or a derivative thereof. In some embodiments, an article including a lignin derivative is provided, where the lignin derivative includes a moiety derived from an antimicrobial compound, where the moiety is represented by Formula II or Formula III:

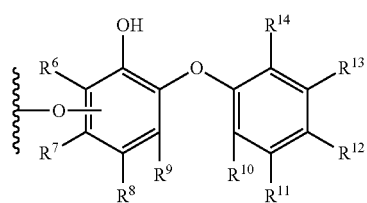

II

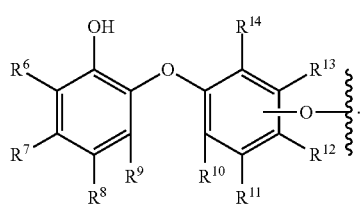

III

In Formula II or Formula III, $R^6$-$R^{14}$ are each independently H, halo, alkyl, alkenyl, aryl or heteroaryl. In some embodiments, $R^6$-$R^{14}$ are each independently H or chloro.

In another aspect, a method is provided of inhibiting microbial growth, where the method includes contacting one or more microbes with any of the above articles.

In another aspect, a method is provided of forming a lignin derivative, where the method includes contacting a lignin-containing material with a compound of Formula V to form the lignin derivative, where the lignin derivative includes a moiety of Formula I:

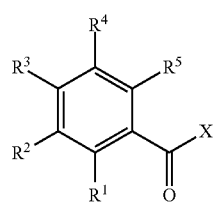

V

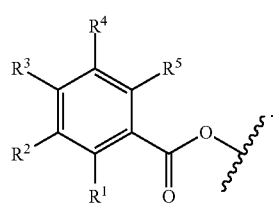

I

In Formula V and Formula I, $R^1$, $R^2$, $R^4$, and $R^5$ are each independently H, alkyl, alkenyl, aryl or heteroaryl; $R^3$ is OH or SH; and X is a leaving group.

According to a further aspect, a method is provided of forming a lignin derivative, where the method includes contacting a lignin-containing material with a compound of Formula VI to form the lignin derivative, where the lignin derivative includes a moiety of Formula II:

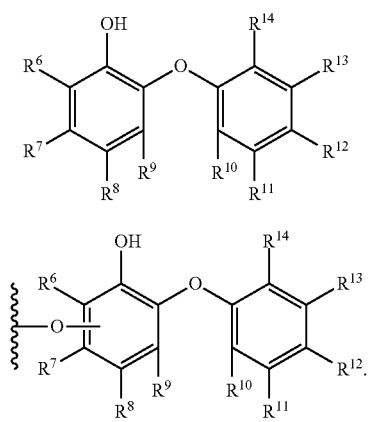

In Formula VI and Formula II, $R^6$, $R^7$, $R^8$, $R^9$, $R^{10}$, $R^{11}$, $R^{12}$, $R^{13}$, and $R^{14}$ are each independently H, halo, alkyl, alkenyl, aryl or heteroaryl.

In some embodiments, the lignin derivative of Formula II is represented by Formula IIA:

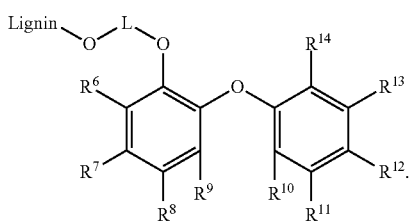

In Formula IIA, $R^6$-$R^{14}$ are as described in Formula II; L is an alkylene moiety, polyalkyleneoxy moiety, or a polyalkyleneoxy moieties interrupted with an arylenealkylenearlylene moiety; and O-Lignin is a lignin residue derived from a hydroxyl group of lignin.

The foregoing summary is illustrative only and is not intended to be in any way limiting. In addition to the illustrative aspects, embodiments and features described above, further aspects, embodiments and features will become apparent by reference to the detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain, branched chain, or cyclic alkyl groups having 1 to 24 carbons or the number of carbons indicated herein. In some embodiments, an alkyl group has from 1 to 16 carbon atoms, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the alkyl groups may be substituted alkyl groups. In some embodiments, the alkyl groups may be cycloalkyl groups.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to, 2-, 3-, 4-, 5-, or 6-substituted phenyl or naphthyl groups, which may be substituted with groups including, but not limited to, amino, alkoxy, alkyl, cyano, and/or halo. In some embodiments, aryl is phenyl or naphthyl. In certain embodiments, aryl is phenyl.

Heteroaryl groups include an aromatic ring containing, for example, 5 to 12, or 5 to 10 atoms including one or more heteroatoms (e.g., 1, 2, 3 or 4 heteroatoms) selected from N, O and S and with the remaining ring atoms being carbon. Heteroaryl groups do not contain adjacent S and O atoms. Unless otherwise indicated, heteroaryl groups may be bound to the parent structure by a carbon or nitrogen atom, as valency permits. For example, "pyridyl" includes 2-pyridyl, 3-pyridyl and 4-pyridyl groups, and "pyrrolyl" includes 1-pyrrolyl, 2-pyrrolyl and 3-pyrrolyl groups. Heteroaryl groups may be monocyclic or polycyclic (e.g., bicyclic, tricyclic). In some embodiments, a heteroaryl group is monocyclic. Examples include pyrrole, pyrazole, imidazole, triazole (e.g., 1,2,3-triazole, 1,2,4-triazole, 1,2,4-triazole), tetrazole, furan, isoxazole, oxazole, oxadiazole (e.g., 1,2,3-oxadiazole, 1,2,4-oxadiazole, 1,3,4-oxadiazole), thiophene, isothiazole, thiazole, thiadiazole (e.g., 1,2,3-thiadiazole, 1,2,4-thiadiazole, 1,3,4-thiadiazole), pyridine, pyridazine, pyrimidine, pyrazine, triazine (e.g., 1,2,4-triazine, 1,3,5-triazine) and tetrazine. In some embodiments, more than one ring of a polycyclic heteroaryl group are aromatic. Examples include indole, isoindole, indazole, benzoimidazole, benzotriazole, benzofuran, and benzoxazole.

The terms "alkylene," "alkenylene," or "arylene," alone or as part of another substituent, means a divalent radical derived from an alkyl, cycloalkyl, alkenyl, aryl, or heteroaryl group, respectively, as exemplified by —CH$_2$CH$_2$CH$_2$CH$_2$—. For alkylene, alkenyl, or aryl linking groups, no orientation of the linking group is implied.

The term "amine" (or "amino") as used herein refers to —NHR and —NRR' groups, where R, and R' are independently hydrogen, or a substituted or unsubstituted alkyl, alkenyl, alkynyl, cycloalkyl, aryl or aralkyl group as defined herein. Examples of amino groups include —NH$_2$, methylamino, dimethylamino, ethylamino, diethylamino, propylamino, isopropylamino, phenylamino, benzylamino, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

Additionally, as will be apparent to those skilled in the art, conventional protecting groups may be necessary during the synthesis of lignin derivatives to prevent certain functional groups from undergoing undesired reactions. The term "protecting group," as used herein, is meant that a particular functional moiety, e.g., O, S, or N, is temporarily blocked so that a reaction can be carried out selectively at another reactive site in a multifunctional compound. "Protecting groups" as used herein are well known in the art and include those described in detail in *Protective Groups in Organic Synthesis*, 4$^{th}$ ed., Greene, T. W. and Wuts, P. G., Eds., John Wiley & Sons, New York: 2007. In particular, the term "protecting group" encompasses a "suitable carboxylic acid protecting group" and a "suitable hydroxyl protecting group" that are well known in the art and includes those described in detail in Greene et al. Non-limiting examples of suitable carboxylic acid protecting groups further include, but are not limited to, silyl-, alkyl-, aryl-, and arylalkyl-protecting groups. Non-limiting examples of suitable hydroxyl protecting groups include methyl, t-butyl, methoxylmethyl (MOM), trimethylsilyl (TMS), benzyloxycarbonate (BOC), triethylsilyl (TES), triisopropylsilyl (TIPS), and the like.

The term "leaving group," as used herein, is well known among those of skill in the art as a labile substituent of a compound that is readily displaced from the compound. Leaving groups, as used herein, are described in *March's Advanced Organic Chemistry*, (John Wiley, and Sons, 5$^{th}$ Edition, 2001), and encompass the group consisting of a halo; OR$^A$; SR$^A$; O(CO)R$^A$; or O(SO$_2$)R$^A$; where each R$^A$ is, independently, hydrogen, alkyl, or aryl. In certain embodiments, each leaving group is, independently, a chloro; bromo; iodo; OCH$_3$; OCH$_2$CH$_3$; —O-phenyl, —O-(nitro)phenyl, p-toluenesulfonate, methylsulfonate, or trifluoromethylsulfonate.

The term "moldable thermoplastic material," as used herein, refers to thermoplastic polymers known in the art, including polymers including at least one of a polyacrylate, a polymethacrylate, a polyolefin, a polyepoxy, a polyurethane, or a polyurea.

The term "antimicrobial compound," as used herein, refers to any compound that kills or inhibits the growth of bacteria (i.e., Gram-positive and/or Gram negative) and/or fungi. As noted, illustrative antimicrobial compounds include a paraben, triclosan, catechin, a tannin, or one or more antimicrobial components from an essential oil.

Esters of para-hydroxybenzoic acid, commonly referred to as "parabens," are a class of organic molecules which generally possess antimicrobial properties, acting as bactericides and fungicides. Parabens typically have low irritant and sensitizing potential and are considered to be non-toxic materials. Accordingly, they find widespread application consumer products including, shampoos, moisturizers, gels, toothpaste, makeup, skin care products, and the like. The general structure of parabens includes a hydroxybenzoate moiety (or a salt form thereof) and is shown below.

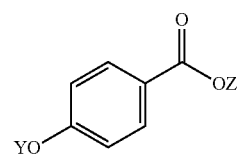

Y = H, Na, etc.
Z = Me, Et, Pr, iPr, Bu, iBu, Bn, etc.

Because of their widespread use, many parabens are produced synthetically on industrial scale, and are available at low cost.

The term "triclosan," 5-chloro-2-(2,4-dichlorophenoxy) phenol, is known to those of ordinary skill as an antibacterial and antifungal agent used in many consumer products. For example, triclosan is used in toothpaste to prevent gingivitis.

The term "catechin," as used herein, refers to any of four related flavan-3-ols, or derivatives thereof, corresponding to (2R,3S)-2-(3,4-dihydroxyphenyl)-3,4-dihydro-2-H-chromene-3,5,7-triol:

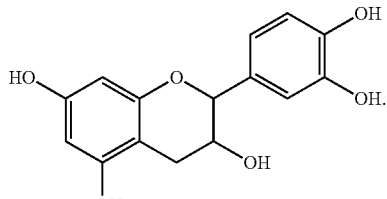

(2R,3S)-2-(3,4-dihydroxyphenyl)-3,4-dihydro-2H-chromene-3,5,7-triol

There are two chiral centers on the catechin molecules, and thus four possible diastereoisomers. Two of the diastereoisomers are in trans configuration and are called catechin and the other two are in cis configuration and are called epicatechin. Making reference to no particular isomer, the four molecules can just be called catechin. Mixtures of the different enantiomers can be called (+/−)-catechin and (+/−)-epicatechin. The most common catechin isomer is (+)-catechin:

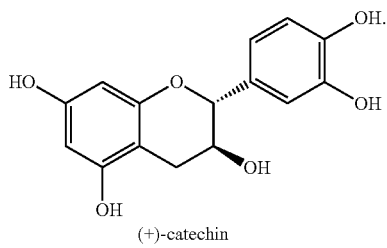 [SMILES: Oc1cc(O)c2c(c1)O[C@H](c1ccc(O)c(O)c1)[C@@H](O)C2]

(+)-catechin

The antimicrobial activity of catechin derivatives has been reported, for example, by Veluri et al., *J. Agric. Food Chem.* 2004 Dec. 15; 52(25):7746.

The tannins are widely distributed in many species of plants. There are three major classes of tannins, the hydrolyzable tannins (based on gallic acid), non-hydrolyzable (flavone-based) tannins, and phlorotannins (based on phloroglucinol). Tannins have molecular weights ranging from 500 to over 3,000 (e.g., gallic acid esters) and up to 20,000 (e.g., proanthocyanidins). Tannic acid, a representative gallic acid ester, is shown below.

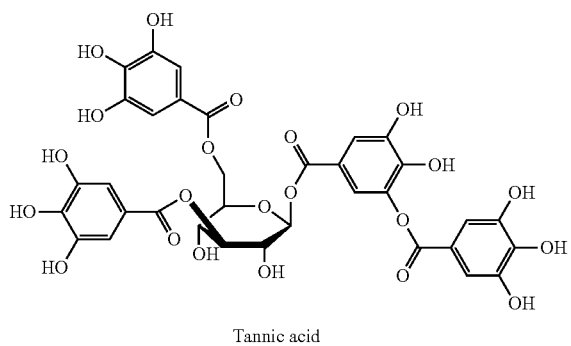

Tannic acid

The antimicrobial activity of tannin derivatives has been reported, for example, by Akiyama et al., *J. Antimicrob. Chemother.* (2001) 48 (4): 487-491.

As used herein, the term "one or more antimicrobial components from an essential oil" refers to one or more "antimicrobial components" such as a monoterpenol, diterpenol, sequiterpenol, phenol, or hydroxycoumarin, that derives from an "essential oil" such as thyme oil, tea tree oil, lavender oil, oregano oil, geranium oil, or lemon oil. In some embodiments, the antimicrobial component from an essential oil has one or more hydroxyl substituents that facilitates coupling of the antimicrobial component to lignin.

As used herein, the term "lignin" refers to a phenolic biopolymer found in vascular plants that provides rigidity and strength to their cell walls. The lignin polymeric structure includes several phenylpropanoid building units interconnected by etheric and carbon-to-carbon linkages. The phenylpropane units are not linked to each other in any systematic order. The phenylpropane units may be methoxylated to various degrees (e.g., trans-coniferyl alcohol and trans-sinapyl alcohol) or non-methoxylated (e.g., trans-p-coumaryl alcohol). Various combinations of these phenylpropane units are polymerized to form the lignin biopolymer.

Extracting lignin from lignocellulosic feedstocks (e.g., plant material) during pulping generally results in irregular lignin fragments. As it is difficult to elucidate and characterize lignin, it may be described in terms of the lignocellulosic plant material from which it was obtained, e.g., hardwood lignins, softwood lignins, and annual fibre lignins, and/or the methods by which it was recovered, e.g., Kraft lignin or organosolv lignin.

Lignin derivatives, and articles made from such lignin derivatives, can be made from lignin recovered during or after pulping of lignocellulosic feedstocks. The pulp may be from any suitable lignocellulosic feedstock including hardwoods, softwoods, annual fibers, and combinations thereof. For example, hardwood feedstocks for the present technology may be selected from *Acacia*, Aspen, Beech, Eucalyptus, Maple, Birch, Gum, Oak, Poplar, and combinations/hybrids thereof. Illustrative softwood feedstocks which may be used herein include cedar; fir; pine; spruce; and combinations thereof. Representative annual fiber feedstocks include biomass derived from annual plants, plants which complete their growth in one growing season and therefore must be planted yearly. Examples of annual fibers include: flax, cereal straw (wheat, barley, oats), sugarcane bagasse, rice straw, corn stover, corn cobs, hemp, fruit pulp, alfa grass, switchgrass, and combinations/hybrids thereof. Lignin derivatives of the present technology can be derived from any feedstock, including those described above.

Lignin derivatives, and articles made from such lignin derivatives, can be made from lignin recovered by a variety of methods. For example, lignin may be obtained by solvent extraction of finely ground wood (milled-wood lignin) or by acidic dioxane extraction (acidolysis) of wood. Derivatives of lignin can be also isolated from biomass pre-treated using steam explosion, dilute acid hydrolysis, ammonia fiber expansion, or autohydrolysis methods. Derivatives of native lignin can be recovered after pulping of lignocellulosics including industrially operated Kraft pulping, soda pulping, and sulphite pulping. Alternatively, the "organosolv" pulping methods known to those of ordinary skill may be used to produce lignin. One organosolv method uses ethanol/solvent pulping (i.e., the Alcell process); a second organosolv method uses alkaline sulphite anthraquinone methanol pulping (i.e., the "ASAM" process); a third organosolv process uses methanol pulping followed by methanol, NaOH, and anthraquinone pulping (i.e., the "organocell" process); a fourth organosolv process uses acetic acid/hydrochloric acid or formic acid pulping (i.e., the "acetosolv" process). Lignin derivatives of the present technology can be recovered by any known method, including those described above.

Lignin derivatives may be prepared by functionalizing lignin through one or more of its various chemically active substituents, such as hydroxyl groups. Further, it is envisioned herein that articles containing depolymerized lignin may also be provided. The lignin may be depolymerized either prior to being functionalized through one or more of its various chemically active substituents, or after the lignin has thus been functionalized.

Depolymerized lignin or lignin derivatives may be prepared, for example, by a process that includes either the hydrogenolysis of lignin or, alternatively, the acid-catalyzed or base-catalyzed treatment of lignin to produce smaller sized lignin particles having an average particle size ranging from, for example, about 40 nanometers (nm) to about 4,000 nm. Alternatively, depolymerized lignin may have an average particle size ranging from, for example, about 40 nm to about 1,000 nm, or from about 40 nm to about 500 nm. Such treated lignin may be referred to herein as "depolymerized lignin." As noted, depolymerizing lignin may include a hydrogenolysis reaction. The hydrogenolysis reaction may be catalyzed by a transition metal (e.g., nickel, iron, copper, platinum, or palladium) catalyst. The transition metal catalyst will generally include one or more ligands, such as carbene ligands. Illustrative carbene ligands include N,N'-bis(2,6-diisopropylphenyl)-4,5-dihydroimidazol-2-ylidene (SIPr), bis(1,3-(2,4,6-trimethylphenyl)imidazol-2-ylidene) (IMes), (N,N'-bis(2,6-diisopropylphenyl)imidazol-2-ylidene) (IPr), N,N'-bis(adamantyl)imidazol-2-ylidene (IAd), 1,3-di-tert-butylimidazol-2-ylidene (ItBu), 1,3-dicyclohexyl-1,3-dihydro-2H-imidazol-2-ylidene (ICy), and 1,3-diisopropyl-4,5-dimethylimidazol-2-ylidene (iPrIM).

Depolymerized lignin or lignin derivatives may also be obtained upon treatment of lignin with protic acid, such as for example, hydrochloric acid, sulfuric acid, and mixtures thereof, although other acid catalysts, including Lewis acid catalysts, could be used. Alternatively, depolymerized lignin may also be obtained upon treatment of the lignin material with an aqueous base catalyst, such as NaOH, KOH, Ca(OH)$_2$, Mg(OH)$_2$ and mixtures thereof, although other base catalysts could be used.

The depolymerization of lignin or lignin derivatives by a process that includes either the hydrogenolysis of lignin or, alternatively, the acid-catalyzed or base-catalyzed treatment of lignin may be conducted in the presence of a polar solvent. The dissolved lignin material can then be subjected to reaction conditions sufficient to at least partially depolymerize the lignin material. The solvents are chosen to achieve solvolysis of lignin, facilitate depolymerization of lignin, and inhibit repolymerization of lignin. Illustrative solvents may include methanol, ethanol, water, and dimethoxyethane, and dimethyl ether.

The instant technology is generally directed to a lignin derivative, where the lignin derivative includes a moiety derived from an antimicrobial compound. Also provided are methods of inhibiting microbial growth with an article including a lignin derivative. The lignin derivatives are characterized by providing protection to an article or materials containing the lignin derivatives from degradation by microbes including bacteria and fungi.

In one aspect, lignin derivatives are provided with antimicrobial moieties that may be incorporated into articles for use in antimicrobial applications. For example, an antimicrobial compound, such as a paraben, triclosan, catechin, a tannin, or one or more antimicrobial components from an essential oil can be covalently attached to lignin to impart antimicrobial activity to the lignin derivative. As noted, native lignin is a cross-linked amorphous organic biopolymer. The lignin derivatives of the present technology may optionally be depolymerized to various degrees. For example, the lignin derivatives of the present technology may be depolymerized before one or more antimicrobial compounds are attached to the depolymerized lignin. Alternatively, one or more antimicrobial compounds can be attached to lignin prior to depolymerization, because the antimicrobial activity of the lignin derivatives of the present technology persists even after depolymerization. In either case, the modified lignin derivative exhibits antimicrobial activity and thus can be incorporated into numerous articles including antimicrobial coatings, pharmaceuticals, cosmetics, and perfume.

In accordance with one aspect, an article including a lignin derivative is provided, where the lignin derivative includes a moiety derived from an antimicrobial compound. In some embodiments, the article is a moldable thermoplastic material. In other embodiments, the article is a cloth, a garment, a coating, packaging, paper product (e.g., cardboard), drywall (i.e., plasterboard, wallboard, or gypsum board for construction), or a toy. In other embodiments, the article has antimicrobial activity. In one embodiment, an article including a lignin derivative is provided, where the lignin derivative includes a moiety derived from an antimicrobial compound, where the antimicrobial compound is a paraben.

In other embodiments, the moiety derived from the antimicrobial compound is represented by Formula I:

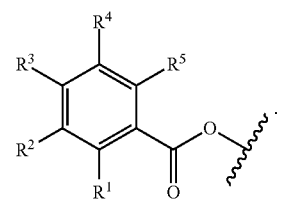

I

In Formula I, $R^1$, $R^2$, $R^4$, and $R^5$ are each independently H, halo, alkyl, alkenyl, aryl or heteroaryl; and $R^3$ is OH or SH. In further embodiments, $R^3$ is OH. In some embodiments, the moiety derived from the antimicrobial compound includes:

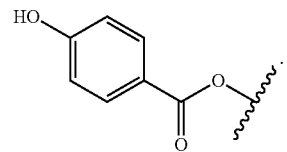 [SMILES: *OC(=O)c1ccc(O)cc1]

In other embodiments, the lignin derivative is represented by Formula IV:

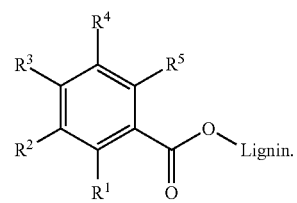

IV

In Formula IV, $R^1$, $R^2$, $R^4$, and $R^5$ are each independently H, halo, alkyl, alkenyl, aryl or heteroaryl; $R^3$ is OH or SH; and O-Lignin is a lignin residue derived from a hydroxyl group of lignin.

As noted, the lignin derivative includes a moiety derived from an antimicrobial compound. In some embodiments, the antimicrobial compound is a tannin, catechin, an antimicrobial component from an essential oil, or a derivative thereof. In other embodiments, the antimicrobial compound is a tannin or a derivative thereof. In some embodiments, the antimicrobial compound is a catechin or a derivative thereof. In some embodiments, the antimicrobial compound is triclosan. In some embodiments, the antimicrobial compound is one or more antimicrobial components from an essential oil.

In some embodiments, the moiety derived from the antimicrobial compound is represented by Formula II or Formula III:

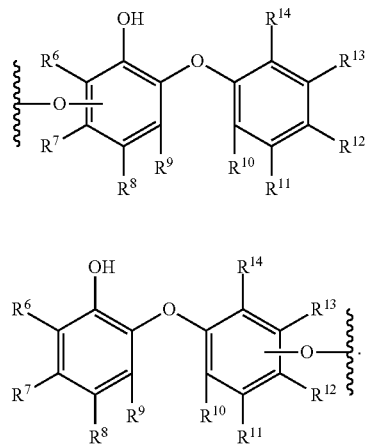

In Formula II or Formula III, $R^6$-$R^{14}$ are each independently H, halo, alkyl, alkenyl, aryl or heteroaryl. In some embodiments, $R^6$-$R^{14}$ are each independently H or chloro.

The lignin derivative includes a moiety derived from an antimicrobial compound, where the moiety can be attached to lignin by a linker group, L. In some embodiments, the lignin derivative is represented by Formula IIA:

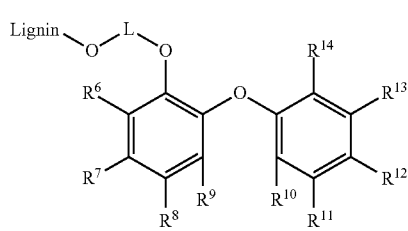

In Formula IIA, $R^6$-$R^{14}$ are each independently H, halo, alkyl, alkenyl, aryl or heteroaryl; L is an alkylene moiety, polyalkyleneoxy moiety, or a polyalkyleneoxy moieties interrupted with an arylenealkylenearlylene moiety; and O-Lignin is a lignin residue derived from a hydroxyl group of lignin. In some embodiments, $R^6$-$R^{14}$ are each independently H or chloro. In other embodiments, L is —CH$_2$CH(OH)CH$_2$—. In other embodiments, L is —CH$_2$CH(OH)CH$_2$OCH$_2$CH(OH)CH$_2$—. In other embodiments, L is a group of formula;

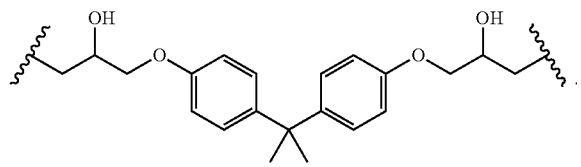 [SMILES: *CC(O)COc1ccc(C(C)(C)c2ccc(OCC(O)C*)cc2)cc1]

In some embodiments, the moiety derived from the antimicrobial compound includes:

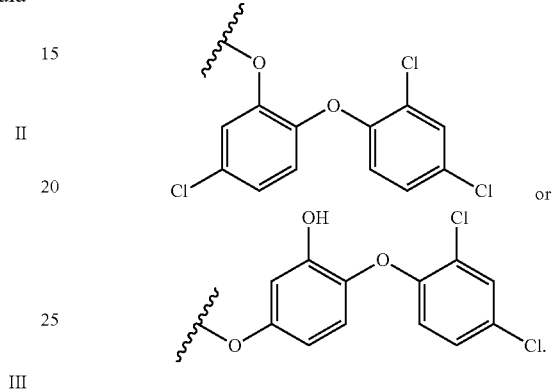

In some embodiments, the moiety derived from the antimicrobial compound includes:

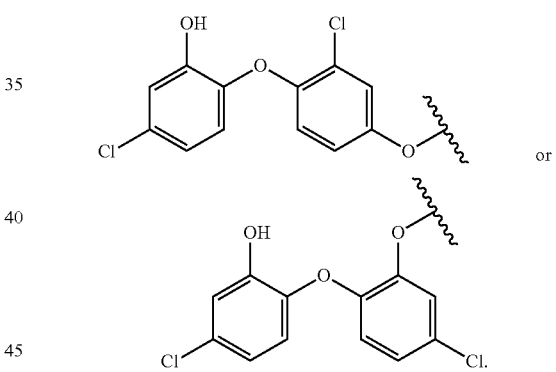

According to another aspect, a method is provided of inhibiting microbial growth, where the method includes contacting one or more microbes with any of the articles described above. The one or more microbes may include, but are not limited to, bacteria or fungi. For example, the bacteria may include Gram-positive and/or Gram negative bacteria.

The antimicrobial activity of the lignin derivatives, or articles thereof, can be evaluated according to various methods, such as those described in the American Association of Textile and Color Chemists (AATCC) Test Method 100-1993, as published in the AATCC Technical Manual, 1997, pages 143-144, and as utilized in published U.S. patent application No. 2011/0117176. Samples of the articles including any of the lignin derivatives having antimicrobial moieties may be evaluated according to Test Method 100-1993 for percent reductions in, for example, *Staphylococcus aureus* colony forming units (CFU) after, for example, a 24-hour exposure time at temperatures of about 25° C.

Alternatively, the antimicrobial activity of lignin derivatives, or articles including the lignin derivatives, can be evaluated according to high throughput methods, such as those described by the National Committee for Clinical Laboratory Standards (NCCLS), Villanova, Pa., *Approved standard M7-A3: Methods for dilution antimicrobial susceptibility tests for bacteria that grow aerobically,* (1993) 3$^{rd}$ ed, and as utilized in published U.S. patent application No. 2010/0240592. For example, the antimicrobial activities of lignin derivatives of the present technology, or articles thereof, may be determined in 96-well plates (e.g., Nunclon® polystyrene) by the standard NCCLS broth microdilution method. Illustrative microorganisms that may be used to determine antibiotic activity include *Escherichia coli* (ATCC 25922) or *Pseudomonas aeruginosa* (*P. aeruginosa* ATCC 27853). Antimicrobial activities may be expressed as the minimal inhibitory concentration (MIC) in µg/ml at which no visible growth is observed after, for example, 18-20 hours of incubation at, for example, 37° C.

According to another aspect, a method is provided of forming a lignin derivative, where the method includes contacting a lignin-containing material with a compound of Formula V to form the lignin derivative, and where the lignin derivative includes a moiety of Formula I:

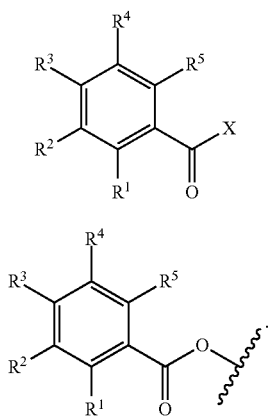

In Formula V and Formula I, $R^1$, $R^2$, $R^4$, and $R^5$ are each independently H, alkyl, alkenyl, aryl or heteroaryl; $R^3$ is OH or SH; and X is a leaving group. In some embodiments, $R^1$, $R^2$, $R^4$, and $R^5$ are each independently H. In other embodiments, the leaving group includes a halogen, —O-alkyl, —O-aryl, —OSO$_2$-alkyl, or —OSO$_2$-aryl. In some embodiments, the leaving group is Cl, Br, I, p-toluenesulfonate, or methylsulfonate. The methods may include contacting the lignin-containing material with the compound of Formula V in the presence of a base or acid. The base or acid catalyzes the condensation reaction between the lignin and the compound of Formula V. Where the method includes a base, the base may be a material such as an aromatic amine, a carbonate salt, an alkai metal hydroxide, or a secondary amine or tertiary amine in which a nitrogen is independently substituted with H, alkyl or aryl groups. Illustrative bases include, but are not limited to, pyridine, 4-methylpyridine, sodium carbonate, potassium carbonate, sodium hydroxide, potassium hydroxide, dimethylamine, diethyl amine, piperidino, trimethylamine, triethylamine, N,N-diisopropylethylamine, or triisopropylamine). Where the method includes an acid, illustrative acids may include, but are not limited to, hydrochloric acid, sulfuric acid, acetic acid, trifluoroacetic acid, or phosphoric acid. In other embodiments, the moiety of Formula I includes a group of formula:

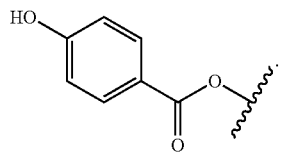

According to another aspect, a method is provided of forming a lignin derivative, where the method includes contacting a lignin-containing material with a compound of Formula VI to form the lignin derivative, and where the lignin derivative includes a moiety of Formula II or a moiety of Formula III:

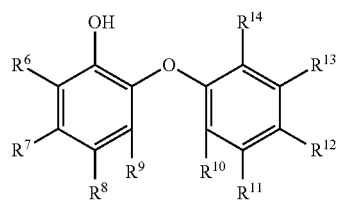

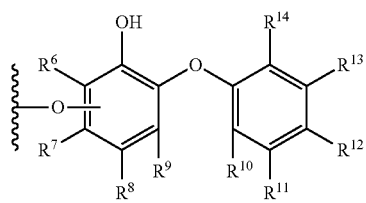

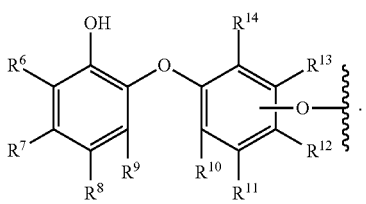

In Formula VI, Formula II, and Formula III, $R^6$-$R^{14}$ are each independently H, halo, alkyl, alkenyl, aryl or heteroaryl. In some embodiments, $R^6$-$R^{14}$ are each independently H or chloro. In some embodiments, the lignin-containing material is contacted with a compound of Formula VI and a "linking agent" to form the lignin derivative comprising the moiety of Formula II. The linking agent may have electrophilic moieties at both ends of the linking agent (e.g., epichlorohydrin (chloromethyloxirane); bisphenol A diglycidyl ether (2-[[4-[2-[4-(oxiran-2-ylmethoxy)phenyl]propan-2-yl]phenoxy]methyl]oxirane); or 2,2'-oxybis(methylene)dioxirane).

In some embodiments, the method of modifying lignin with one or more antimicrobial compounds can be used to form a lignin derivative represented by Formula IIA:

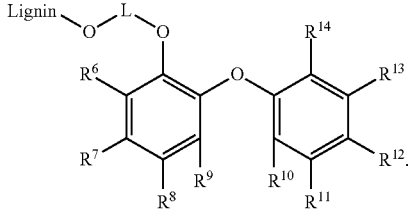

In Formula IIA, $R^6$-$R^{14}$ are each independently H, halo, alkyl, alkenyl, aryl or heteroaryl; L is an alkylene moiety, polyalkyleneoxy moiety, or a polyalkyleneoxy moieties interrupted with an arylenealkylenearlylene moiety; and O-Lignin is a lignin residue derived from a hydroxyl group of lignin.

In the lignin derivative represented by Formula IIA, L is a linking group. In some embodiments, for example, L is —CH$_2$CH(OH)CH$_2$—. In other embodiments, L is —CH$_2$CH(OH)CH$_2$OCH$_2$CH(OH)CH$_2$—. In other embodiments, L is a group of formula;

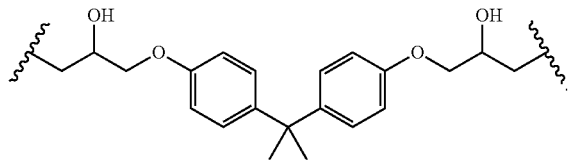 [SMILES: *CC(O)COc1ccc(C(C)(C)c2ccc(OCC(O)C*)cc2)cc1]

In some embodiments, the linking group, L, derives from a linking agent having electrophilic moieties at both ends of the linking agent (e.g., epichlorohydrin (chloromethyloxirane); bisphenol A diglycidyl ether (2-[[4-[2-[4-(oxiran-2-yl-methoxy)phenyl]propan-2-yl]phenoxy]methyl]oxirane); or 2,2'-oxybis(methylene)dioxirane). In other embodiments, $R^6$-$R^{14}$ are each independently H or chloro.

In some embodiments, the method of modifying lignin with an antimicrobial compound can be used to form a lignin derivative, where the lignin derivative includes a moiety of Formula II such as:

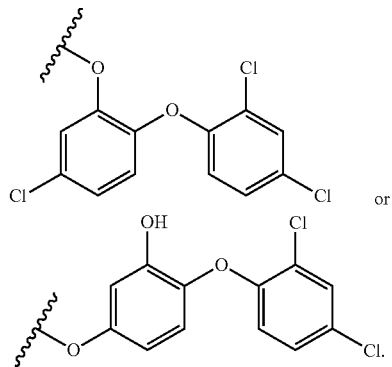

In other embodiments, the method of modifying lignin with an antimicrobial compound can be used to form a lignin derivative, where the lignin derivative includes a moiety of Formula III such as:

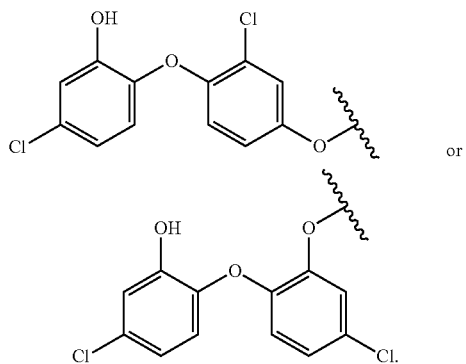

Depending on the application, the method of modifying lignin with one or more antimicrobial compounds to form a lignin derivative may further include at least partially depolymerizing the lignin before forming the lignin derivative. In other embodiments, the method further includes at least partially depolymerizing the lignin derivative after forming the lignin derivative. In some embodiments, the depolymerizing includes treating the lignin or the lignin derivative with an acid catalyst. In other embodiments, the depolymerizing includes treating the lignin or the lignin derivative with a basic catalyst. In some embodiments, the depolymerizing includes subjecting the lignin or the lignin derivative to a hydrogenolysis reaction. In other embodiments, the hydrogenolysis reaction is conducted in the presence of a transition metal catalyst. In some embodiments, the transition metal catalyst includes nickel. In other embodiments, the transition metal catalyst further includes a carbene ligand. In some embodiments, the carbene ligand is selected from the group consisting of N,N'-bis(2,6-diisopropylphenyl)-4,5-dihydroimidazol-2-ylidene (SIPr), bis(1,3-(2,4,6-trimethylphenyl)imidazol-2-ylidene) (IMes), (N,N'-bis(2,6-diisopropylphenyl)imidazol-2-ylidene) (IPr), N,N'-bis(adamantyl)imidazol-2-ylidene (IAd), 1,3-di-tert-butylimidazol-2-ylidene (ItBu), 1,3-dicyclohexyl-1,3-dihydro-2H-imidazol-2-ylidene (ICy), and 1,3-diisopropyl-4,5-dimethylimidazol-2-ylidene (iPrIM). In other embodiments, the carbene ligand is N,N'-bis(2,6-diisopropylphenyl)-4,5-dihydroimidazol-2-ylidene (SIPr). In one embodiment, the carbene ligand is N,N'-bis(2,6-diisopropylphenyl)-4,5-dihydroimidazol-2-ylidene (SIPr).

The present technology, thus generally described, will be understood more readily by reference to the following Examples, which are provided by way of illustration and are not intended to be limiting of the present technology.

EXAMPLES

It will be appreciated that where reaction conditions (e.g., temperatures, times, mole ratios of reactants, solvents, pressures, etc.) are given, other conditions can also be used unless otherwise stated. Optimum reaction conditions may vary with the particular reactants or solvent used, but such conditions can be determined by one skilled in the art by routine optimization procedures.

Example 1

Synthesis of a 4-Hydroxybenzoic Acid Derivative of Lignin

As illustrated in Scheme 1, lignin can be modified with an antimicrobial compound, such as 4-hydroxybenzoic acid, having a suitable leaving group, using synthetic methods known to those of ordinary skill. For example, the phenolic group of 4-hydroxybenzoic acid may be protected with a suitable protecting group (e.g., benzyloxycarbonate group) and the carboxylic acid may be converted to a suitable leaving group (e.g., an acyl chloride). The resulting benzyl 4-(chlorocarbonyl)phenyl carbonate may be combined with lignin and a suitable solvent, such as dimethylether, dimethoxyethane, or dimethylformamide. A base, such as K$_2$CO$_3$ or a tertiary amine, may be added with stirring to yield lignin having 4-(benzyloxycarbonyloxy)benzoate moieties. Deprotection of the benzyloxycarbonate protecting groups can be achieved by conventional means, such as by treatment with trifluoroacetic acid, to yield lignin derivatives having one or more 4-hydroxybenzoate moieties.

Scheme 1:

Modifying lignin with a paraben to produce a lignin derivative represented by Formula IV, such the lignin derivative shown below having one or more 4-hydroxybenzoate moieties.

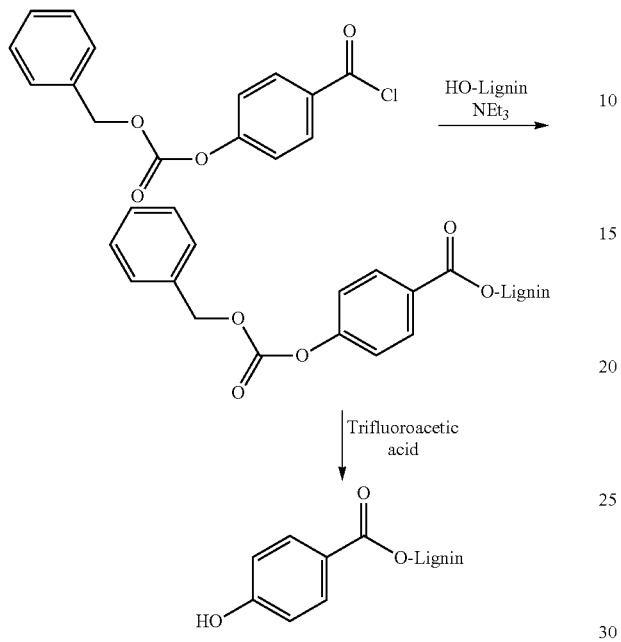

Example 2

Palladium-Catalyzed Coupling of a Protected Triclosan Derivative to Lignin

As illustrated in Scheme 2, antimicrobial compounds such as triclosan may be coupled to lignin using a palladium-catalyzed coupling reaction known to those of ordinary skill. For example, the palladium-catalyzed coupling of an aryl chloride and an aliphatic alcohol has been reported using a di-1-adamantyl-substituted bipyrazolylphosphine ligand. *J. Am. Chem. Soc.,* 2010, 132 (33), pp 11592-11598. Consequently, the benzyloxycarbonate derivative of triclosan may be coupled to lignin using similar reaction conditions.

Scheme 2:

A representative palladium-catalyzed coupling procedure for attaching triclosan to lignin to produce a lignin derivative represented by Formula III, such the triclosan lignin derivative shown below.

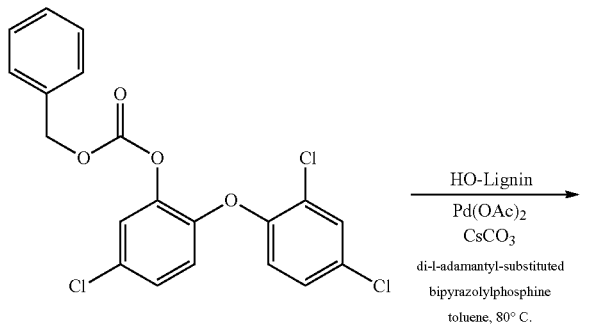

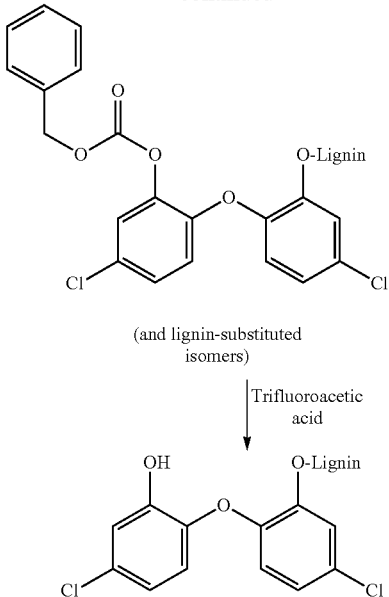

(and lignin-substituted isomers)

Example 3

The Coupling of Triclosan to Lignin Via Dehydration

As illustrated in Scheme 3, alcohols or phenols such as triclosan may be coupled to lignin via dehydration, at elevated temperatures (e.g., at or about 100° C.) to drive off water formed from the reaction, and with a catalyst such as hydrochloric acid, sulfuric acid, or alumina (i.e., $Al_2O_3$). See *March's Advanced Organic Chemistry*, John Wiley, and Sons, $4^{th}$ Edition, 1992, p1011, and references cited therein.

Scheme 3:

The coupling of triclosan to lignin via dehydration to produce a lignin derivative represented by Formula II, such the triclosan lignin derivative shown below.

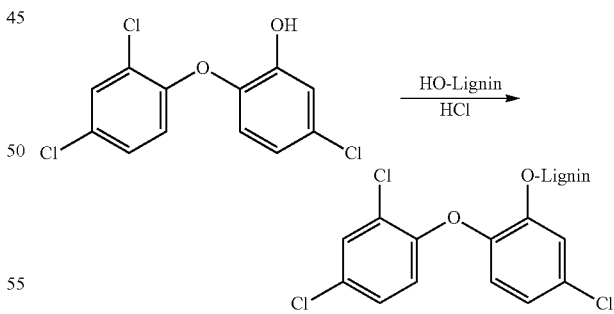

Example 4

Linking Antimicrobial Compounds to Lignin with Epichlorohydrin-Derived Linkers

As illustrated in Schemes 4a-4-c, antimicrobial compounds, such as parabens (e.g., butyl paraben), triclosan, or catechin may be combined with lignin and a linker precursor, such as epichlorohydrin, having electrophilic moieties at both ends of the linker-precursor. The mixture may then be treated with base, such as a tertiary amine or $K_2CO_3$, and optionally heated above 25° C. to form lignin derivatives having the antimicrobial compounds attached via linkers such as 2-hydroxypropyl groups.

Schemes 4a-4c.

Representative synthetic routes for attaching antimicrobial moieties to lignin with a linker made from a linker-precursor (e.g., epichlorohydrin) having electrophilic moieties at both ends of the linker-precursor.

Scheme 4a:

The attachment of a paraben to lignin via an epichlorohydrin-derived linker to produce a lignin derivative.

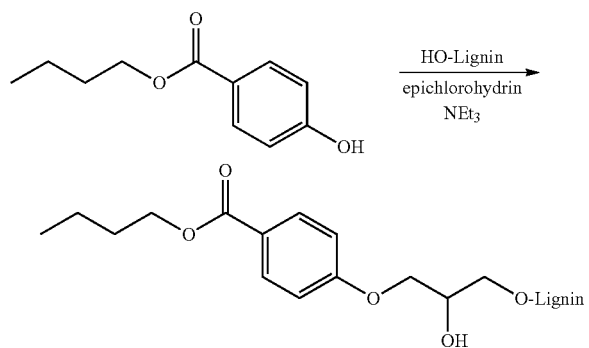

Scheme 4b:

The attachment of triclosan to lignin via an epichlorohydrin-derived linker to produce a lignin derivative represented by Formula IIA, such the lignin derivative shown below.

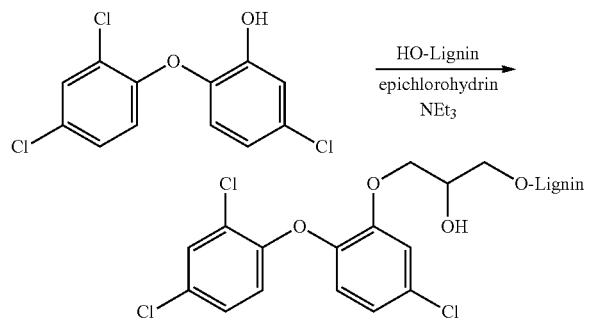

Scheme 4c:

The attachment of catechin to lignin via an epichlorohydrin-derived linker to produce a lignin derivative, such as those shown below.

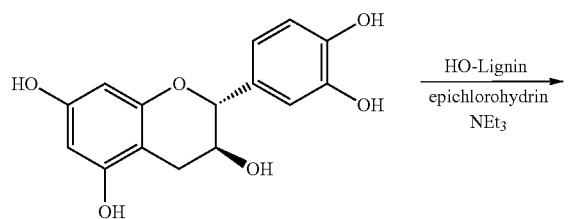

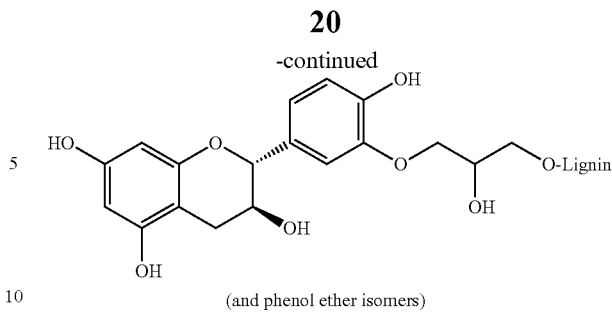

(and phenol ether isomers)

+

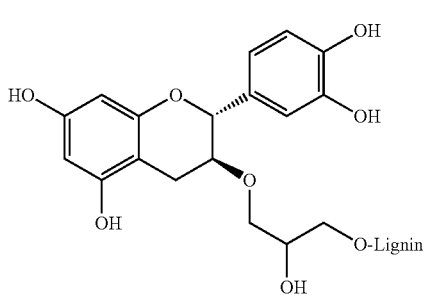

Example 5

Antimicrobial Testing of Articles Having Lignin Derivatives with Antimicrobial Moieties The antimicrobial activity of the articles of this technology can be evaluated according to methods known to those of skill in the art, such as those described in U.S. patent application No. 2011/0117176. For example, articles having lignin derivatives with antimicrobial moieties can be cut into square samples (e.g., about 3.0 cm by 3.0 cm) and evaluated for antimicrobial activity according to the American Association of Textile and Color Chemists (AATCC) Test Method 100-1993, as published in the AATCC Technical Manual, 1997, pages 143-144. The Test Method may include, for example, a suitable strain of *Staphylococcus aureus*, Tryptic Soy Broth as the nutrient broth, and/or Tryptic Soy Agar as the nutrient agar. Samples of the articles having lignin derivatives with antimicrobial moieties may then be evaluated for percent reductions in *S. aureus* colony forming units (CFU) after, for example, a 24-hour exposure time at temperatures of about 25° C. It is contemplated that the articles having lignin derivatives with antimicrobial moieties will have greater antimicrobial properties (e.g., percent reductions in in *S. aureus* colony forming units) than corresponding articles that lack such lignin derivatives.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. An article comprising a lignin derivative, wherein the lignin derivative comprises a moiety derived from an antimicrobial compound, and the article is a moldable thermoplastic material, and the lignin derivative is represented by Formula IV:

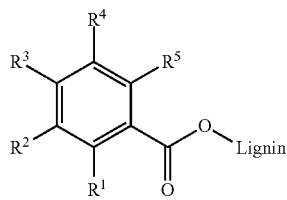

wherein:
$R^1$, $R^2$, $R^4$, and $R^5$ are each independently H, halo, alkyl, alkenyl, aryl or heteroaryl;

$R^3$ is OH or SH; and
O-Lignin is a lignin residue derived from a hydroxyl group of lignin.

2. The article of claim 1, wherein $R^1$, $R^2$, $R^4$, and $R^5$ are each H and $R^3$ is OH.

3. An article comprising a lignin derivative, wherein the lignin derivative comprises a moiety derived from an antimicrobial compound, and the article is a moldable thermoplastic material, and the lignin derivative is represented by Formula IIA:

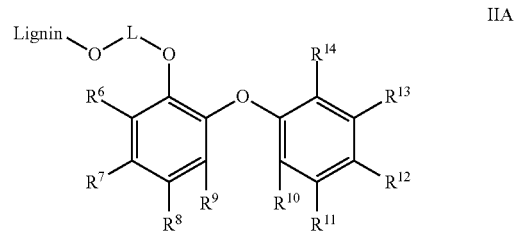

wherein:
$R^6$, $R^7$, $R^8$, $R^9$, $R^{10}$, $R^{11}$, $R^{12}$, $R^{13}$, and $R^{14}$ are each independently H, halo, alkyl, alkenyl, aryl or heteroaryl;
L is an alkylene moiety or polyalkyleneoxy moiety; and
O-Lignin is a lignin residue derived from a hydroxyl group of lignin.

4. The article of claim 3, wherein L is —CH$_2$CH(OH)CH$_2$—.

5. The article of claim 3, wherein L is —CH$_2$CH(OH)CH$_2$OCH$_2$CH(OH)CH$_2$—.

6. The article of claim 3, wherein $R^6$, $R^7$, $R^8$, $R^9$, $R^{10}$, $R^{11}$, $R^{12}$, $R^{13}$, and $R^{14}$ are each independently H or chloro.

7. The article of claim 3, wherein the moiety derived from the antimicrobial compound comprises:

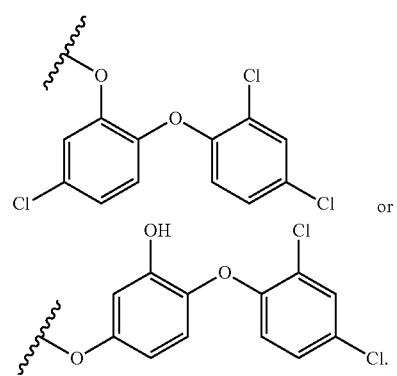

8. The article of claim 3, wherein the moiety derived from the antimicrobial compound comprises:

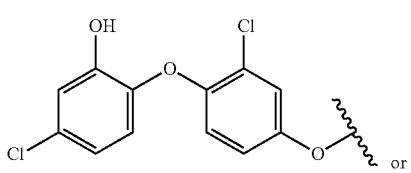

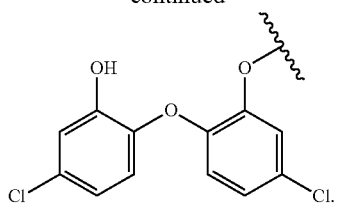

9. A method of inhibiting microbial growth, the method comprising: contacting one or more microbes with an article according to claim 1.

10. The method of claim 9, wherein the one or more microbes comprise bacteria.

11. The method of claim 9, wherein the one or more microbes comprise fungi.

12. A method of inhibiting microbial growth, the method comprising: contacting one or more microbes with an article according to claim 3.

13. A method of forming a lignin derivative, the method comprising:
contacting a lignin-containing material with a compound of Formula VI to form the lignin derivative, wherein the lignin derivative comprises a moiety of Formula IIA:

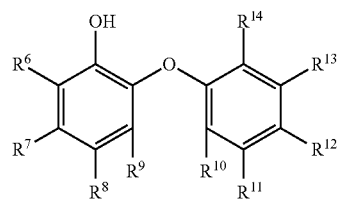

wherein:

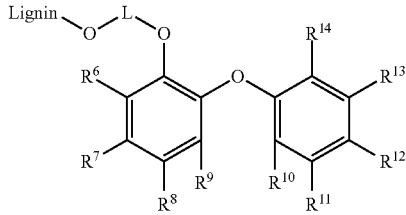

$R^6$, $R^7$, $R^8$, $R^9$, $R^{10}$, $R^{11}$, $R^{12}$, $R^{13}$, and $R^{14}$ are each independently H, halo, alkyl, alkenyl, aryl or heteroaryl;

L is an alkylene moiety or polyalkyleneoxy moiety; and

O-Lignin is a lignin residue derived from a hydroxyl group of lignin.

14. The method of claim 13, further comprising at least partially depolymerizing the lignin.

15. The method of claim 14, wherein the depolymerizing comprises a hydrogenolysis reaction.

16. The method of claim 15, wherein the hydrogenolysis reaction is conducted in the presence of a transition metal catalyst.

17. The method of claim 16, wherein the transition metal catalyst comprises nickel.

18. The method of claim 16, wherein the transition metal catalyst further comprises a carbene ligand.

19. The method of claim 13, wherein the contacting is conducted in the presence of a base.

20. The method of claim 19, wherein the base comprises an alkali metal hydroxide, a carbonate, a secondary amine, an aromatic amine, or a tertiary amine.

21. The method of claim 13, wherein contacting is conducted in the presence of an acid.

22. The method of claim 21, wherein the acid comprises hydrochloric acid, sulfuric acid, acetic acid, trifluoroacetic acid, or phosphoric acid.

* * * * *

UNITED STATES PATENT AND TRADEMARK OFFICE
CERTIFICATE OF CORRECTION

| | |
|---|---|
| PATENT NO. | : 8,541,556 B1 |
| APPLICATION NO. | : 13/738424 |
| DATED | : September 24, 2013 |
| INVENTOR(S) | : Gu |

It is certified that error appears in the above-identified patent and that said Letters Patent is hereby corrected as shown below:

In the Specification

In Column 13, Line 56, delete "alkai" and insert -- alkali --, therefor.

In Column 18, Line 64, delete "4a-4-c," and insert -- 4a-4c, --, therefor.

In Column 19, Line 6, delete "4a-4-c." and insert -- 4a-4c: --, therefor.

In Column 20, Line 49, delete "in in" and insert -- in --, therefor.

Signed and Sealed this
Sixth Day of May, 2014

Michelle K. Lee
*Deputy Director of the United States Patent and Trademark Office*